(12) United States Patent
Elkhatib et al.

(10) Patent No.: US 9,549,273 B2
(45) Date of Patent: Jan. 17, 2017

(54) SELECTIVE ENABLING OF A COMPONENT BY A MICROPHONE CIRCUIT

(71) Applicant: QUALCOMM Incorporated, San Diego, CA (US)

(72) Inventors: Mouna Elkhatib, San Diego, CA (US); Louis Dominic Oliveira, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 15 days.

(21) Appl. No.: 14/471,490

(22) Filed: Aug. 28, 2014

(65) Prior Publication Data

US 2016/0066113 A1    Mar. 3, 2016

(51) Int. Cl.
| | |
|---|---|
| H04R 29/00 | (2006.01) |
| H04R 1/08 | (2006.01) |
| G06F 3/16 | (2006.01) |
| G06F 1/32 | (2006.01) |
| G10L 25/51 | (2013.01) |
| G10L 15/08 | (2006.01) |
| G10L 25/78 | (2013.01) |

(52) U.S. Cl.
CPC ........... *H04R 29/004* (2013.01); *G06F 1/3215* (2013.01); *G06F 3/167* (2013.01); *G10L 25/51* (2013.01); *H04R 1/08* (2013.01); *G10L 25/78* (2013.01); *G10L 2015/088* (2013.01)

(58) Field of Classification Search
None
See application file for complete search history.

(56) References Cited

U.S. PATENT DOCUMENTS

| | | | |
|---|---|---|---|
| 6,266,424 B1 | 7/2001 | Papadopoulos et al. | |
| 6,564,330 B1* | 5/2003 | Martinez | G06F 1/24 |
| | | | 713/322 |
| 7,562,020 B2 | 7/2009 | Le et al. | |
| 8,171,322 B2 | 5/2012 | Fiennes et al. | |
| 8,666,751 B2* | 3/2014 | Murthi | G06F 1/3234 |
| | | | 704/231 |
| 9,245,527 B2* | 1/2016 | Lindahl | G10L 15/32 |
| 9,361,885 B2* | 6/2016 | Ganong, III | G10L 15/22 |
| 2005/0071170 A1 | 3/2005 | Comerford | |
| 2013/0110521 A1 | 5/2013 | Hwang et al. | |
| 2013/0202142 A1 | 8/2013 | Turnbull et al. | |

(Continued)

FOREIGN PATENT DOCUMENTS

WO    2012025784 A1    3/2012

OTHER PUBLICATIONS

Kite, "Understanding PDM Digital Audio", 2012, pp. 1-9.*
International Search Report and Written Opinion—PCT/US2015/044463—ISA/EPO—Oct. 30, 2015, 10 pages.

*Primary Examiner* — Paul Huber
(74) *Attorney, Agent, or Firm* — Toler Law Group, PC (57) ABSTRACT

A microphone circuit includes a microphone configured to generate a microphone signal. The microphone circuit also includes a processor configured to perform sound detection based on the microphone signal and to determine whether to enable a component based on the sound detection. For example, the processor may be a digital signal processor (DSP) of the microphone circuit and the component may be external to the microphone circuit, such as a coder/decoder (CODEC), another DSP, and/or an application processor.

30 Claims, 9 Drawing Sheets

(56) References Cited

U.S. PATENT DOCUMENTS

| | | |
|---|---|---|
| 2013/0246071 A1 | 9/2013 | Lee et al. |
| 2013/0289994 A1* | 10/2013 | Newman .................. G10L 15/22 704/254 |
| 2013/0339028 A1 | 12/2013 | Rosner et al. |
| 2014/0012573 A1 | 1/2014 | Hung et al. |
| 2014/0163978 A1 | 6/2014 | Basye et al. |
| 2014/0170979 A1 | 6/2014 | Samanta Singhar |

* cited by examiner

FIG. 9

SELECTIVE ENABLING OF A COMPONENT BY A MICROPHONE CIRCUIT

I. FIELD

The present disclosure is generally related to a microphone circuit.

II. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player.

Always-on operations are becoming increasingly common in mobile devices. For example, in always-on audio operation, certain component(s) in a mobile device may remain powered on, even when a user places the mobile device in a sleep or power-save mode. The always-on components may activate other component(s) during certain conditions. Current systems generally implement such always-on operation in one of two ways. According to a first implementation, a microphone and coder/decoder (CODEC) remain powered on, even when the mobile device is in a sleep or power-save mode. The CODEC may include an activity detection module to determine an energy level detected by the microphone. If the energy level is high enough, the CODEC wakes up an application processor to perform a more advanced detection operation (e.g., to detect particular speech phrases). However, this implementation may involve waking up the application processor more often than necessary, including in situations when the microphone detects sounds that are not of interest, such as soft ambient noises or jostling of the mobile device.

According to a second implementation, activity detection and sound detection may be both performed by an always-on CODEC or voice processor, which wakes up the application processor based on the results of the sound detection. The second implementation may be more power-efficient than the first implementation, by virtue of waking up the higher-power application processor less often. However, because the CODEC or voice processor is always-on, components of the CODEC or voice processor that are unrelated to activity detection or sound detection (e.g., top and block level power management circuitry, clock tree buffers, wakeup control state machines, bus interfaces, etc.) may be always-on, resulting in battery drain at a mobile device.

III. SUMMARY

A microphone circuit that is configured to selectively activate another component, such as a component of a mobile device that is external to the microphone circuit, is disclosed. The microphone circuit may be a digital microphone circuit that performs microphone activity detection (MAD) and sound detection. Based on the results of the MAD and sound detection, the microphone circuit may selectively activate one or more external components (e.g., CODEC, voice processor, application processor, etc.). Because MAD and sound detection may be performed at the microphone circuit, the external components may be woken up less often, which may reduce overall power consumption at the mobile device.

To illustrate, a low-power hardware MAD block and a low-power processor dedicated to performing sound detection (e.g., a digital signal processor (DSP)) may be included in a microphone circuit. The MAD block may be always-on (or duty cycled) to execute MAD. When the MAD block detects an energy level that satisfies a threshold, the low-power DSP within the microphone circuit may be turned on to perform sound detection. When a particular sound of interest is detected by the DSP, the microphone circuit may wake up an external CODEC to buffer data. The CODEC, in turn, may wake up an external application processor and may send the application processor a data stream corresponding to the buffered data.

In a particular embodiment, a microphone circuit includes a microphone configured to generate a microphone signal. The microphone circuit also includes a processor configured to perform sound detection based on the microphone signal and to determine whether to enable a component based on the sound detection.

In another particular embodiment, a method includes generating a microphone signal at a microphone circuit of a mobile device. The method also includes performing, at a processor of the microphone circuit, sound detection based on the microphone signal. The method further includes determining, at the processor based on the sound detection, whether to enable a component of the mobile device.

In another particular embodiment, an apparatus includes a microphone circuit including means for generating a microphone signal. The microphone circuit also includes means for performing sound detection based on the microphone signal and for determining whether to enable a component external to the microphone circuit based on the sound detection.

In another particular embodiment, a non-transitory computer-readable storage medium includes instructions that, when executed by a computer, cause the computer to perform operations including performing sound detection at a processor of a microphone circuit of a mobile device based on a microphone signal to determine whether to enable a component of the mobile device. The operations also include selectively enabling the component of the mobile device based on the sound detection.

Particular advantages provided by at least one of the disclosed embodiments include an ability to perform initial activity and sound detection at an always-on (or duty cycled) microphone circuit. As a result, other components, such as an external CODEC and processor(s), may be kept in a power-save mode to conserve power and may be selectively enabled based on the results of operations performed by the microphone circuit. Other aspects, advantages, and features of the present disclosure will become apparent after review of the entire application, including the following sections: Brief Description of the Drawings, Detailed Description, and the Claims.

V. DETAILED DESCRIPTION

Figure 1:
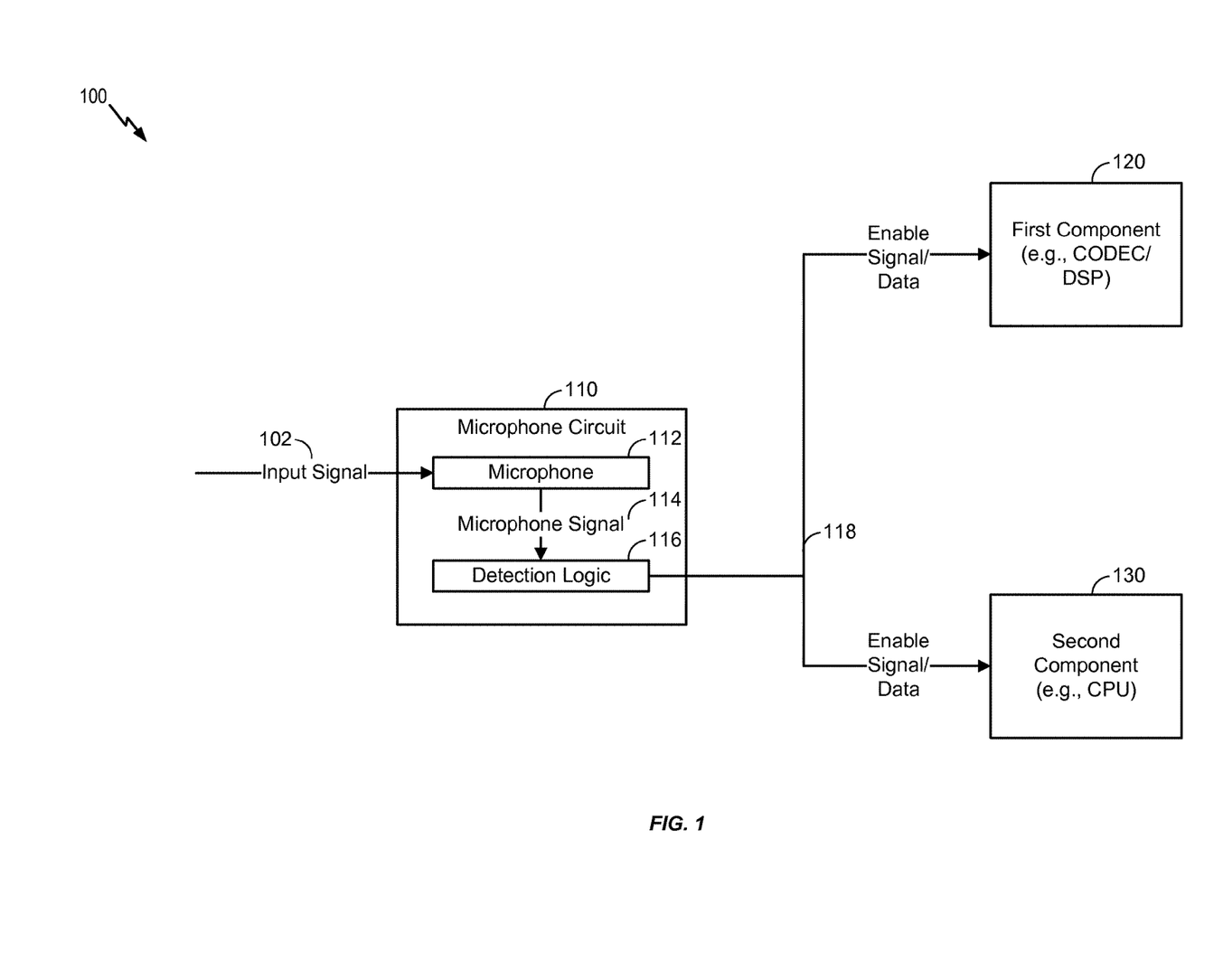
FIG. 1 is a diagram to illustrate a particular embodiment of a system that includes a microphone circuit operable to selectively enable another component of the system.

Referring to FIG. 1, a particular embodiment of a system 100 is shown. The system 100 includes a microphone circuit 110 that is operable to selectively enable another component of the system 100. For example, as further described herein, the microphone circuit 110 may be configured to selectively enable, and optionally disable, a first component 120 and a second component 130. Each of the components 120, 130 may be external to the microphone circuit 110, as shown. In an illustrative embodiment, the system 100 may be included in a mobile computing device, such as a mobile phone, tablet computer, laptop computer, etc.

The microphone circuit 110 includes a microphone 112. In a particular embodiment, the microphone circuit 110 is a digital microphone circuit. The microphone 112 may receive an input signal 102 and generate a microphone signal 114 based on the input signal 102. For example, the microphone signal 114 may be an electrical signal and the microphone 112 may include a diaphragm and/or transducer. As an illustrative non-limiting example, the microphone 112 may be a microelectrical mechanical systems (MEMS) type microphone. The input signal 102 may be an audible signal or an inaudible signal, such as when the microphone 112 is an ultrasound microphone, as further described with reference to FIG. 2.

In a particular embodiment, the detection logic 116 corresponds to hardware within the microphone circuit 110. Alternatively, or in addition, the detection logic 116 may be implemented using software, such programming of a microcontroller, processor-executable instructions, etc. The detection logic 116 may be configured to determine, based on the microphone signal 114, whether to enable another component of the system.

For example, the microphone 112 and at least a portion of the detection logic 116 may be "always-on" components of the system 100. Always-on components of the system 100 may remain enabled even when other components of the system 100, such as the components 120 and 130, are disabled. When a component is enabled, the component may also be referred to as being in an "active" mode, an "operational" mode, or an "awake" mode. When a component is disabled, the component may also be referred to as being in an "inactive" mode, a "power-save" mode, or a "sleep" mode. The detection logic 116 may determine whether to enable the first component 120 or the second component 130 based on the microphone signal 114, as further described herein.

It should be noted that "always-on" may, but does not necessarily, correspond to being enabled at all times while power/battery life is available at a device. An always-on component may alternatively be enabled less than 100% of the time (e.g., duty cycled), but more often than components that are not classified as always-on. For example, the rate of always-on components being powered on and off may be dynamically and intelligently controlled based on time of day or other factors. To illustrate, late at night, the always-on components may check for activity less often, because a user is more likely to be asleep. As another example, always-on components may be powered on less frequently when one or more sensors (e.g., global positioning system (GPS), camera, ambient light, motion, etc.) at a device indicate that the device is likely in a user's pocket, in a dark room, has remained motionless for a prolonged period, etc. In a particular embodiment, always-on components may be clocked independently of other components. Thus, one or more components or operations described herein as being "always-on" may be duty cycled and activated periodically. Different components of a system may have different duty cycles. As an illustrative non-limiting example, the microphone 112 and at least a portion of the detection logic 116 may be activated more frequently (e.g., have a greater duty cycle) than the external components 120 and/or 130.

In a particular embodiment, the first component 120 may be a CODEC block that is external to (e.g., "off-chip" with respect to) the microphone circuit 110. For example, the CODEC block may include a CODEC, a DSP, a memory, or any combination thereof. The second component 130 may be an application processor that is also external to the microphone circuit 110. For example, the application processor may include a central processing unit (CPU). The first component 120 and the second component 130 may be configured to be disabled when not in use to save power. The microphone circuit 110 may selectively send an enable signal and/or data 118 to the first component 120 and/or the second component 130 based on a result of operations performed by the detection logic 116. By selectively enabling the higher-power components 120, 130 when needed, the microphone circuit 110 may reduce an overall power consumption of the system 100, because the components 120, 130 may remain in sleep mode for longer periods of time.

During operation, the microphone 112 may generate the microphone signal 114 based on the input signal 102. The detection logic 116 may perform one or more operations based on the microphone signal 114. For example, the detection logic 116 may perform MAD to determine whether the microphone signal 114 includes or is characteristic of energy that satisfies (e.g., exceeds) an energy threshold. When the MAD indicates the presence of energy that satisfies the energy threshold, the detection logic 116 may perform sound detection to determine whether the microphone signal 114 represents a particular sound (e.g., a particular keyword or keyphrase). Additional examples regarding MAD and sound detection operations are further described with reference to FIG. 2. The microphone circuit 110 may enable the first component 120 and/or the second component 130 based on the MAD and sound detection. To illustrate, the microphone circuit 110 may enable an external CODEC block and send the external CODEC block modulated audio data for buffering. Alternatively, or in addition, a CPU may be enabled and a data stream may be sent to the CPU for further processing.

The system 100 of FIG. 1 may provide selective enabling of external components based on operations performed by always-on (or duty cycled) components of a microphone circuit. For example, because MAD and sound detection may be performed at a low-power microphone circuit, high-power external components may be powered on less often, which may reduce overall power consumption at the system 100. Thus, by placing both activity detection and sound detection functionality in a microphone circuit instead of in a more complex system-on-chip (SoC), such as a CODEC, voice processor chip, or application processor, the system 100 of FIG. 1 may provide always-on capability at mobile devices with improved battery life. To illustrate, a determination by the microphone circuit regarding whether to enable another component may consume less power than making such a determination by a higher-power component, such as a CODEC.

Figure 2:
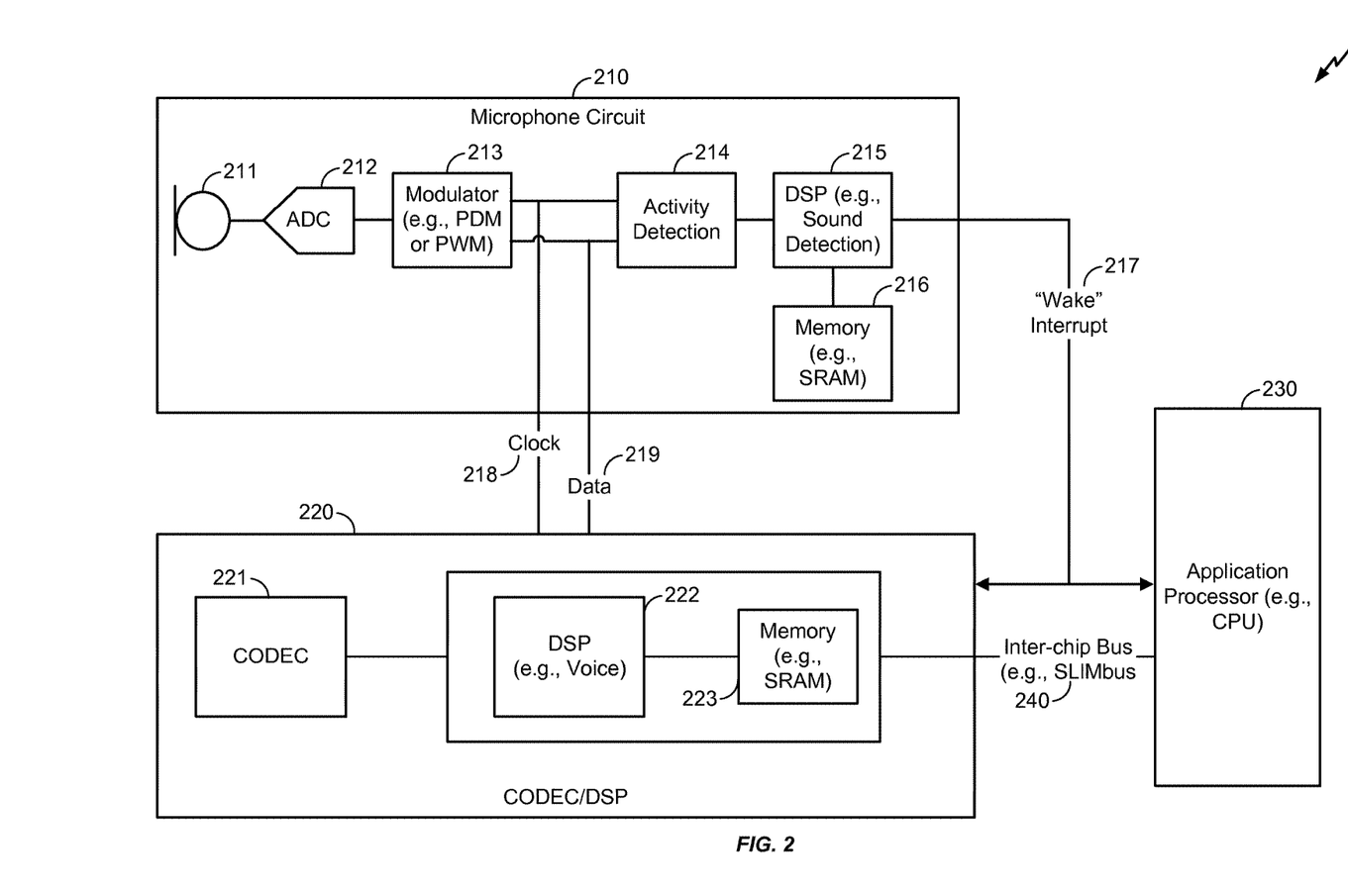
FIG. 2 is a diagram to illustrate a particular embodiment of a system that includes a microphone circuit that includes a subset of always-on (or duty cycled) components and that is operable to selectively enable other components within or external to the microphone circuit.

Referring to FIG. 2, a particular embodiment of a system 200 that includes a microphone circuit 210 is shown. The microphone circuit 210 may be coupled to one or more external components, such as a CODEC/DSP block 220 and/or an application processor (e.g., CPU) 230. In an illustrative embodiment, the microphone circuit 210 may correspond to the microphone circuit 110 of FIG. 1, the CODEC/DSP block 220 may correspond to the first component 120 of FIG. 1, and the application processor 230 may correspond to the second component 130 of FIG. 1.

As explained with reference to FIG. 1, different embodiments of the microphone circuit of the present disclosure may include different components. In the embodiment of FIG. 2, the microphone circuit includes a microphone 211, an analog-to-digital converter (ADC) 212, a modulator 213, an activity detection module 214, and a first DSP 215. In a particular embodiment, the first DSP 215 may be configured to perform operations including, but not limited to, sound detection operations (e.g., to determine whether a particular keyword or keyphrase is spoken). The first DSP 215 may be coupled to a memory 216 that stores data used by the first DSP 215 during operations (e.g., sound detection operations). For example, the memory 216 may store code or instructions executed by the first DSP 215. The microphone 211 may include a diaphragm and/or transducer, and the microphone 211 may be configured to generate an analog microphone signal based on an input signal. As an illustrative non-limiting example, the microphone 211 may be a MEMS type microphone. The ADC 212 may convert the analog microphone signal into a digital microphone signal that may be provided to the modulator 213. In a particular embodiment, the ADC 212 is part of an application-specific integrated circuit (ASIC) within the microphone circuit 110.

The modulator 213 may output a modulated signal based on the digital microphone signal. In an illustrative embodiment, the modulator 213 performs pulse-density modulation (PDM) or pulse-width modulation (PWM). In alternative embodiments, the modulator 213 may apply one or more different modulation techniques. The activity detection module 214 may receive the modulated signal and a clock signal from the modulator 213. The activity detection module 214 may determine whether energy satisfying an energy threshold is being detected by the microphone 211. For example, the activity detection module 214 may perform MAD operations as described with reference to the detection logic 116 of FIG. 1. The activity detection module 214 may output a result of MAD operations and the modulated signal (or a signal generated therefrom) to the first DSP 215, which may perform sound detection operations. Based on a result of the sound detection operations (e.g., when a match is detected between an input signal and data retrieved from the memory 216), the DSP may selectively issue a "wake" interrupt 217 (e.g., an enable signal) to an external component, such as the CODEC/DSP block 220 and/or the application processor 230. It should be noted that the inclusion of various components in the microphone circuit 210 is for illustration only and is not to be considered limiting. In alternative embodiments, the microphone circuit 210 may include more, fewer, and/or different components than shown. As an illustrative non-limiting example, the activity detection module 214, the first DSP 215, and the memory 216 may be optional and/or may be external to the microphone circuit 210.

The CODEC/DSP block 220 may be an "off chip" block with respect to the microphone circuit 210 and may include a CODEC 221, a second DSP 222, and/or a memory 223. In a particular embodiment, the second DSP 222 may be configured to perform operations including, but not limited to, voice processing operations. In the illustrated embodiment, the memory 223 and the memory 216 are static random access memory (SRAM) devices. In alternate embodiments, the memories 216, 223 may correspond to storage technologies other than SRAM. It should be noted that although FIG. 2 illustrates the CODEC/DSP block 220 as including the CODEC 221, the second DSP 222, and the memory 223, in alternative embodiments the CODEC/DSP block 220 may include more, fewer, and/or different components (e.g., sub-blocks). As an illustrative non-limiting example, in selected embodiments the memory 223 may be optional and/or external to a block that includes the CODEC 221. As another illustrative non-limiting example, the second DSP 222 may be optional and/or external to the CODEC/DSP block 220.

Thus, in different embodiments, the CODEC/DSP block 220 may include different components and may perform different operations. In an illustrative example, the CODEC 221 represents a front-end audio processing component of the system 200, such as a low-power front end component. For example, the CODEC 221 may include one or more ADCs and/or digital-to-analog converters (DACs). In a particular embodiment, the CODEC 221 may include a sigma delta modulator and a high-quality decimation filter. Alternatively, or in addition, the microphone circuit 110 may include a sigma delta modulator and a lower-quality decimation filter. In a particular embodiment, the CODEC 221 performs programmable gain control and parameter adjustment, and buffers data (e.g., received from the microphone circuit 110) until another component, such as the second DSP 222 or the application processor 230, is activated. The CODEC 221 may also perform additional functions. For example, the CODEC 221 may include one or more DAC signal paths used during audio playback, such as when the system 200 is included in an electronic device (e.g., a wireless telephone, tablet computer, etc.). The CODEC 221 may also include one or more ADC signal paths that are used when the CODEC 221 is coupled to an analog microphone or analog microphone circuit. The CODEC 221 may include one or more bus interfaces used for communication between the CODEC 221 and one or more other components. Examples of such interfaces may include, but are not limited to, integrated interchip sound ($I^2S$), serial low-power interchip media bus (SLIMbus), and soundwire interfaces. In a particular embodiment, the CODEC 221 includes one or more mixers. For example, such mixer(s) may be used when a mobile phone is used to playback music while conducting a telephone call. The CODEC 221 may also include one or more digital signal processing filters. Examples of such signal processing filters may include, but are not limited to, high-pass filters, low-pass filters, digital equalization filters, etc.

After being woken up (e.g., enabled) by the microphone circuit 110 via the wake interrupt 217, the CODEC/DSP block may receive a clock signal 218 and modulated audio data 219 from the microphone circuit 210. In a particular embodiment, the CODEC 221 and/or the second DSP 222 may perform digital signal processing (e.g., voice processing) operations on the received data 219. The memory 223 may operate as a buffer into which the data 219 (or date generated therefrom) is stored. The memory 223 may also store code or instructions executed by the second DSP 222. For example, the data 219 may be "raw" (e.g., unprocessed and/or uncompressed) audio data that includes one or more frames. To illustrate, each frame may correspond to 20 milliseconds (ms). The CODEC/DSP block 220 may extract audio features from the audio data to generate audio feature data. In a particular embodiment, the audio feature data may be substantially smaller in size than the "raw" audio data. The audio feature data may be stored in a buffer (e.g., at the memory 223). In a particular embodiment, the audio feature data may indicate particular characteristics of the audio data, such as pitch, tone, volume, and/or rhythmic characteristics. The "raw" audio data may be discarded after the audio feature data is extracted.

In a particular embodiment, the CODEC/DSP block 220 is configured to selectively wake up (e.g., enable), the application processor 230, such as by issuing another wake interrupt 217. The CODEC/DSP block 220 may send a data stream, based on data buffered in the memory 223, to the application processor 230 for further processing. For example, the data stream may be sent via an inter-chip bus 240. In an illustrative embodiment, the inter-chip bus 240 may be a SLIMbus. In alternate embodiments, a different type of bus may be used. In a particular embodiment, the application processor 230 may be activated via the wake interrupt 217 prior to or simultaneously with activation of the CODEC/DSP block 220.

In a particular embodiment, MAD performed by the activity detection module 214 may include using a root mean square (RMS) meter to calculate an energy level present at the microphone 211. A programmable threshold detector may cause the first DSP 215 to be enabled in response to an energy threshold being satisfied (e.g., exceeded). In this way, more intensive sound detection by the first DSP 215 may not be initiated unless MAD indicates that an acoustic (or ultrasonic) event has likely occurred. In a particular embodiment, MAD operations performed by the activity detection module 214 may include performing low-power decimation, applying a weighting or bandpass filter, determining a RMS level, and using a threshold detector. Performing MAD may also include performing a downsampling operation to reduce a power consumption of the threshold detector. For example, performing MAD may include downsampling PDM output from the modulator into pulse-code modulation (PCM) signals before checking the RMS energy level. The PCM signals may be provided to the first DSP 215.

In a particular embodiment, the system 200 supports voice recognition operations (e.g., at one or more of the processors 215, 222, 230). For example, when a user says "Computer, call John," the activity detection module 214 may detect microphone activity, and one or more of the processors 215, 222, 230 may determine that the user has spoken a command, recognize the command, and initiate a telephone call.

Although aforementioned examples are described with reference to detecting and processing voice/speech, such examples are not to be considered limiting. Embodiments of the present disclosure may be used with various types of signal energies, activity detection, and sound detection operations. For example, a system according to the present disclosure may include a feature extractor. To illustrate, the feature extractor may be incorporated into or implemented by the activity detection module 214, the first DSP 215, the CODEC/DSP block 220 (or a component thereof), and/or the application processor 230. The feature extractor may be configured to extract audio features from audio data. In a particular embodiment, the feature extractor may include a plurality of filters that filter the audio data to generate energies (e.g., mel-band energies) of filtered audio data. For example, the filters may be mel-band filters, where each mel-band filer corresponds to a different portion of a human perception frequency scale (e.g., octave). To illustrate, the filters may include N mel-band filters that generate mel-band energies corresponding to N octaves, where N is an integer greater than or equal to one. In an illustrative embodiment, N=22. In an alternate embodiment, the feature extractor may perform fast Fourier transform (FFT)-based feature extraction or feature extraction based on another mechanism.

In a particular embodiment, the system 200 may support multiple types of operations at the first DSP 215, the second DSP 222, and/or the application processor 230. For example, a listen location operation may include converting input sound into audio signatures. The signatures may be sent to a server, and the server may compare the signatures to signatures received from other devices. If signatures from different devices are similar, the server may determine that the different devices are in the same acoustical space, which may indicate that the different devices are in the same physical location, listening to the same content, or have a similar context as determined by surrounding sound. For example, listen location may be used in a social network service to group people and/or share an item with a group of people.

As another example, a continuous audio fingerprinting (or audio watermarking) operation may attempt to detect the existence of pre-enrolled (e.g., predetermined) sound snapshots. Continuous audio fingerprinting may robustly detect perceptually identical sound snapshots in the presence of sound-quality distortions, such as distortion related to channel degradation, equalization, speed change, digital-to-analog or analog-to-digital conversion, etc. Continuous audio fingerprinting may thus find application in music and broadcast identification scenarios.

As another example, a continuous keyword detection operation may detect the existence of pre-enrolled (e.g., predetermined) keyword sets. Continuous keyword detection may be performed in a relatively low-power state and may activate predefined applications and/or components based on detected keywords. The keyword sets may be programmable by an application processor, such as the application processor 230. In a particular embodiment, models for keywords may be downloaded by the application processor. Continuous keyword detection may thus enable voice-activation commands without the use of a dedicated voice command button or non-verbal user input.

As another example, a target sound detection operation may detect a type of sound and may notify corresponding applications or components to respond to the sound. For example, upon detecting speech, target sound detection may cause a voice recording application to record the speech. As another example, upon detecting music, target sound detection may cause an application to identify properties of the music, such as song title, artist name, and album name.

As another example, a novelty detection operation may detect changes in input audio that correspond to changes in location and/or changes in activity. Novelty detection may be used in conjunction with other sound recognition operations (e.g., listen location and target sound detection) to identify location and sound activity, and to log the corresponding time for subsequent usage and analysis. Novelty detection may also be used to activate other sound recognition operations when there is a noticeable change in environmental acoustics.

Although various examples may be described herein with reference to audio data, it should be noted that the system 200 may support audible (e.g., 0-16 kilohertz (kHz) sampling rate), beacon (e.g., 16-24 kHz sampling rate), and ultrasound (e.g., >24 kHz sampling rate) input. To support multiple types of input, the microphone 211 may be capable of receiving audio, beacon, and ultrasound signals. Alternately, additional microphones and/or microphone circuits may be incorporated into the system 200 for ultrasound and/or beacon detection. Components used to convert sound signals to electrical signals may include, but are not limited to, microphones, piezoelectric sensors, and ultrasound transducers. Different operations may be performed based on whether the activity detection module 214 detects audio or ultrasound.

Various detection and classification methods may be used at the system 200, and more than one method may be used at once. In a particular embodiment, root mean square (RMS) or band-power classification may be used to determine whether a received signal includes data in the audio, beacon, and/or ultrasound ranges. A time-domain method may include use of filter banks with signal level detection, where each filter is designed to extract a particular type of sound and where filter output levels are compared to thresholds to qualify sounds. A frequency-domain method may include performing a FFT of mel-spaced cepstral coefficients to derive frequencies used to classify the input signal. A sound content method may involve pattern matching by correlating input signals with a known pattern (e.g., to determine whether input signals are received from an ultrasound digital stylus). A model-based approach may include computing a probability that the input signal matches a predetermined music or speech model. Such models may be stored at the memory 216 and/or the memory 223. Novelty detection may involve detecting changes in input sound characteristics. When a change is detected, applications may be notified to update context information (e.g., whether a device is indoors or outdoors). For example, when a user goes from an indoor environment to an outdoor environment, the resulting change in input sound characteristics may result in an application at the user's mobile phone increasing a ringer volume of the phone.

The systems and methods of the present disclosure may enable use of audible and non-audible inputs to perform various operations. Examples of use cases include, but are not limited to: voice recognition to control devices (e.g., televisions, game consoles, computers, and phones) and audio recognition for contextual awareness. Additional examples may include acoustic and pulse recognition for a digital stylus (e.g., an ultrasound digital stylus for handwriting input to digital devices via transmission of ultrasound), ultrasound gesture or proximity detection, device-to-device positioning using ultrasound, sound beacons to identify locations of devices, content identification by audio fingerprinting, peer discovery and proximity sensing by sound matching, and location estimation by sound matching.

The use cases may also include audio threshold record triggering, which may enable a user to set up a device to automatically record incoming audio when activity is detected at the microphone 211. The use cases may further include acoustic touch, which may enable components of a device to remain powered off until a user has touched a screen (as detected based on a sound of the user touching the screen). The use cases may include automatic turning on and turning off of active noise cancellation (ANC). The use cases may also include assisted listening, in which a device may provide (e.g., display), in response to detecting a speaker's voice information about the speaker and detected subjects/keywords. The use cases may also include sound monitoring, such as monitoring children at home, notifying a user of "abnormal" audio events, provide an activity summary report, generate a log of audio activity, posting items to a social network based on detected sound, etc.

It should be noted that the description herein of certain operations being performed by a CODEC, a DSP, or an application processor are not to be considered limiting. In alternative embodiments, certain functions described as being performed by the CODEC 221 may instead be performed by the second DSP 222 or the application processor 230. As another example, a function described as being performed by the second DSP 222 may alternatively be performed by a component external to the CODEC/DSP block 220. Further, the sequential order of certain operations described herein should not be considered limiting. In alternative embodiments, the operations may be performed in a different order and/or may be performed at least partially concurrently. For example, the wake interrupt 217 may be used to wake up the application processor 230 before waking up the CODEC/DSP block 220. The present disclosure should therefore not be considered as being limited to any single described or illustrated embodiment or order of operations.

In a particular embodiment, the microphone circuit 210 may consume less power than the CODEC/DSP block 220, which may consume less power than the application processor 230. As an illustrative non-limiting example, power consumption of always-on components of the microphone circuit 210 may be 1 milliwatt (mW) or less. Thus, the system 200 may provide selective activation of higher-power components by lower-power components.

Figure 3:
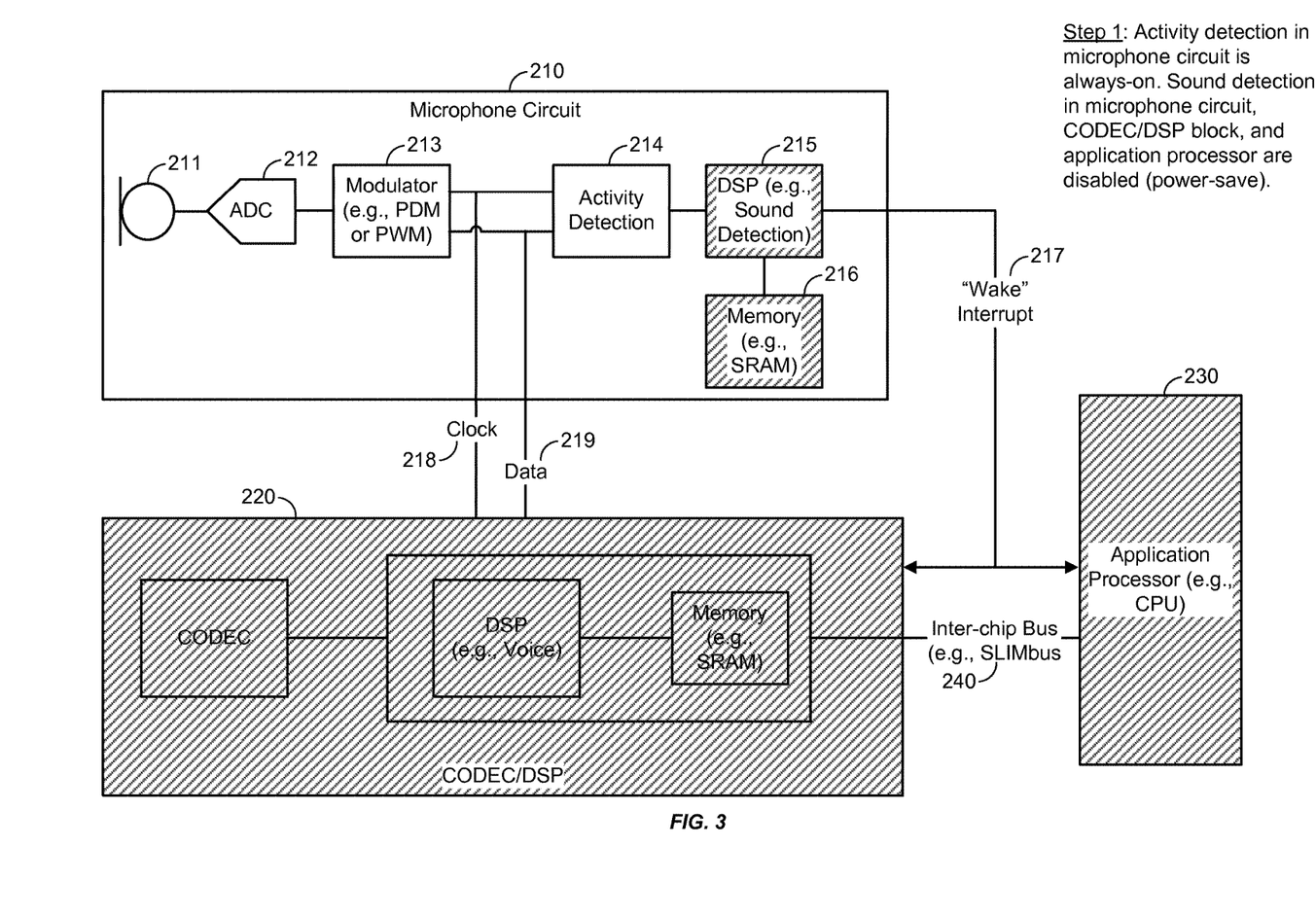
FIG. 3 is a diagram to illustrate a first step of operation at the system of FIG. 2.

For example, referring to FIG. 3, the microphone circuit 210 may include a subset of always-on components, such as the microphone 211, the ADC 212, the modulator 213, and the activity detection module 214. The first DSP 215 may be selectively enabled or disabled based on MAD operations performed at the activity detection module. The memory 216 may be always-on or may be configured to be selectively enabled or disabled. The CODEC/DSP block 220 and the application processor 230 may also be configured to be selectively enabled or disabled. FIG. 3 represents an initial state of the system 200 of FIG. 2, and is designated "Step 1." As another example, a subset of components of the microphone circuit 210, such as the microphone 211, the ADC 212, the modulator 213, and the activity detection module 214, may have a particular duty cycle. The first DSP 215 and the memory 216 may be selectively enabled/disabled or may have a second duty cycle that is smaller than the first duty cycle (i.e., the first DSP 215 and the memory 216 are active for a smaller percentage of time than the microphone 211, the ADC 212, the modulator 213, and the activity detection module 214). The CODEC/DSP block 220 (and components thereof) and the application processor 230 may be selectively enabled/disabled or may have third and fourth duty cycles that are smaller than the first duty cycle and the second duty cycle.

As shown in FIG. 3, the microphone 211, the ADC 212, the modulator 213, and the activity detection module 214 may be always-on components. The first DSP 215, the memory 216, the CODEC/DSP block 220, and the application processor 230 are disabled, illustrated in FIG. 3 via a hatching pattern. Clock/data lines between the microphone circuit 210, the CODEC/DSP block 220, and the application processor 230 may be idle. When the system is in the configuration shown in FIG. 3 the activity detection module 214 may perform MAD operations to determine if an energy level of energy detected by the microphone 211 satisfies an energy threshold.

Figure 4:
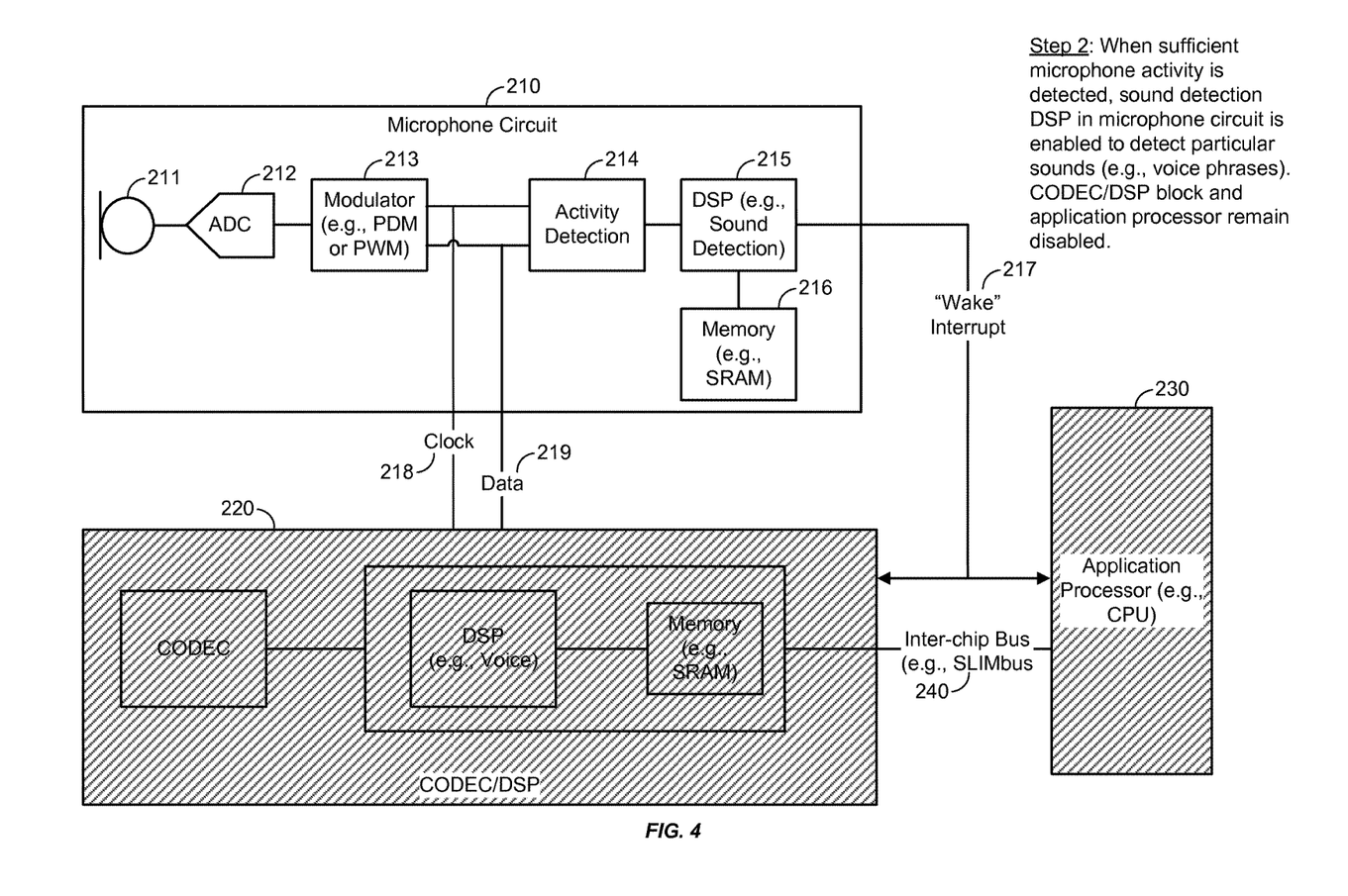
FIG. 4 is a diagram to illustrate a second step of operation at the system of FIG. 2.

Continuing to FIG. 4 (designated "Step 2"), when microphone energy satisfying the energy threshold is detected, the activity detection module 214 may enable the first DSP 215 and the memory 216. The first DSP 215 may perform sound detection operations to determine whether particular sounds are detected. The CODEC/DSP block 220 and the application processor 230 may remain disabled, as shown. Clock/data lines between the microphone circuit 210, the CODEC/DSP block 220, and the application processor 230 may remain idle.

Figure 5:
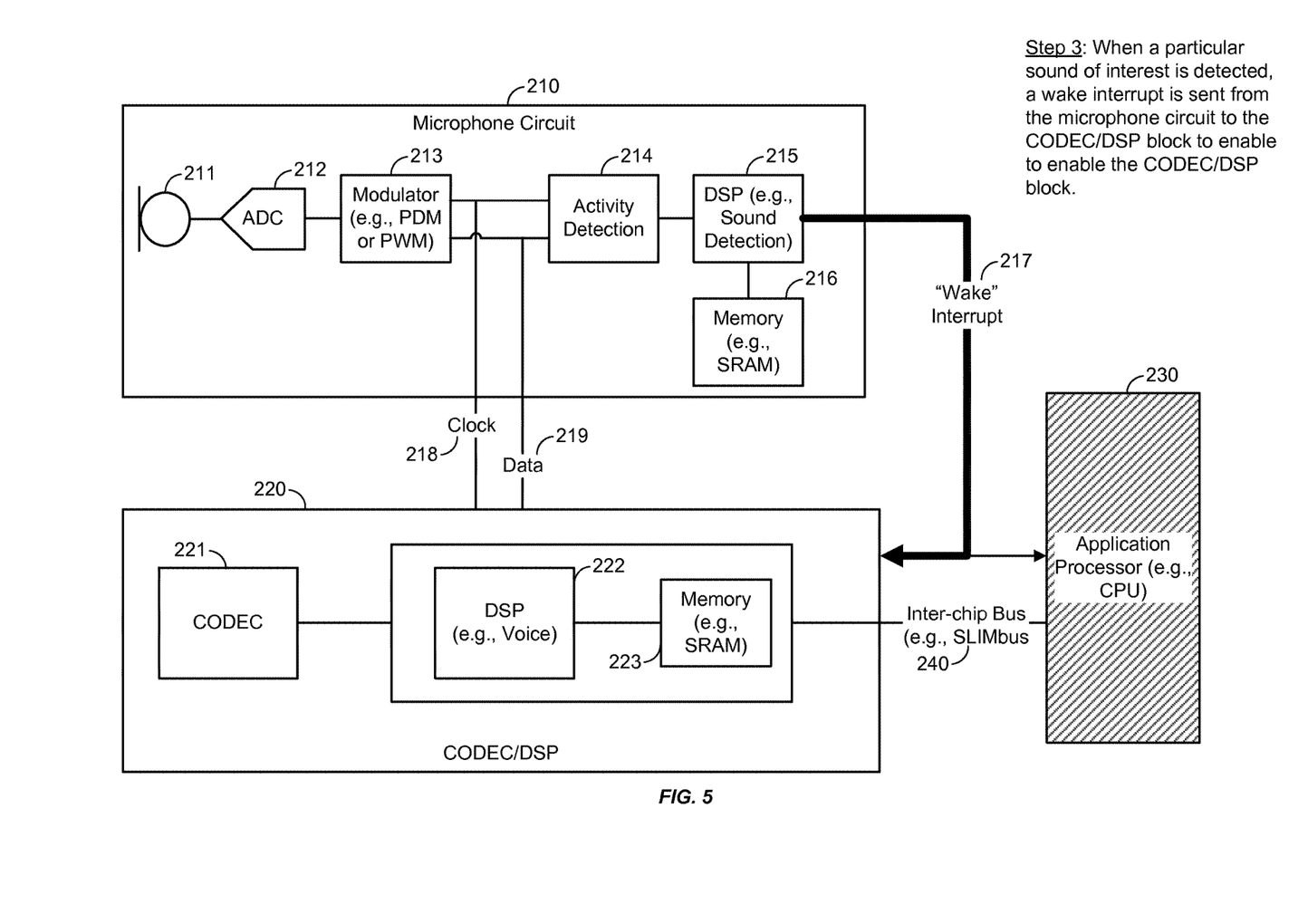
FIG. 5 is a diagram to illustrate a third step of operation at the system of FIG. 2.

Advancing to FIG. 5 (designated "Step 3"), when the first DSP 215 detects a particular sound of interest, the wake interrupt 217 may be sent to the CODEC/DSP block 220 to enable the components within the CODEC/DSP block 220. The application processor 230 may remain disabled, as shown. Alternatively, when the first DSP 215 detects a particular sound of interest, the wake interrupt 217 may be sent to the application processor 230 to enable the application processor 230.

Figure 6:
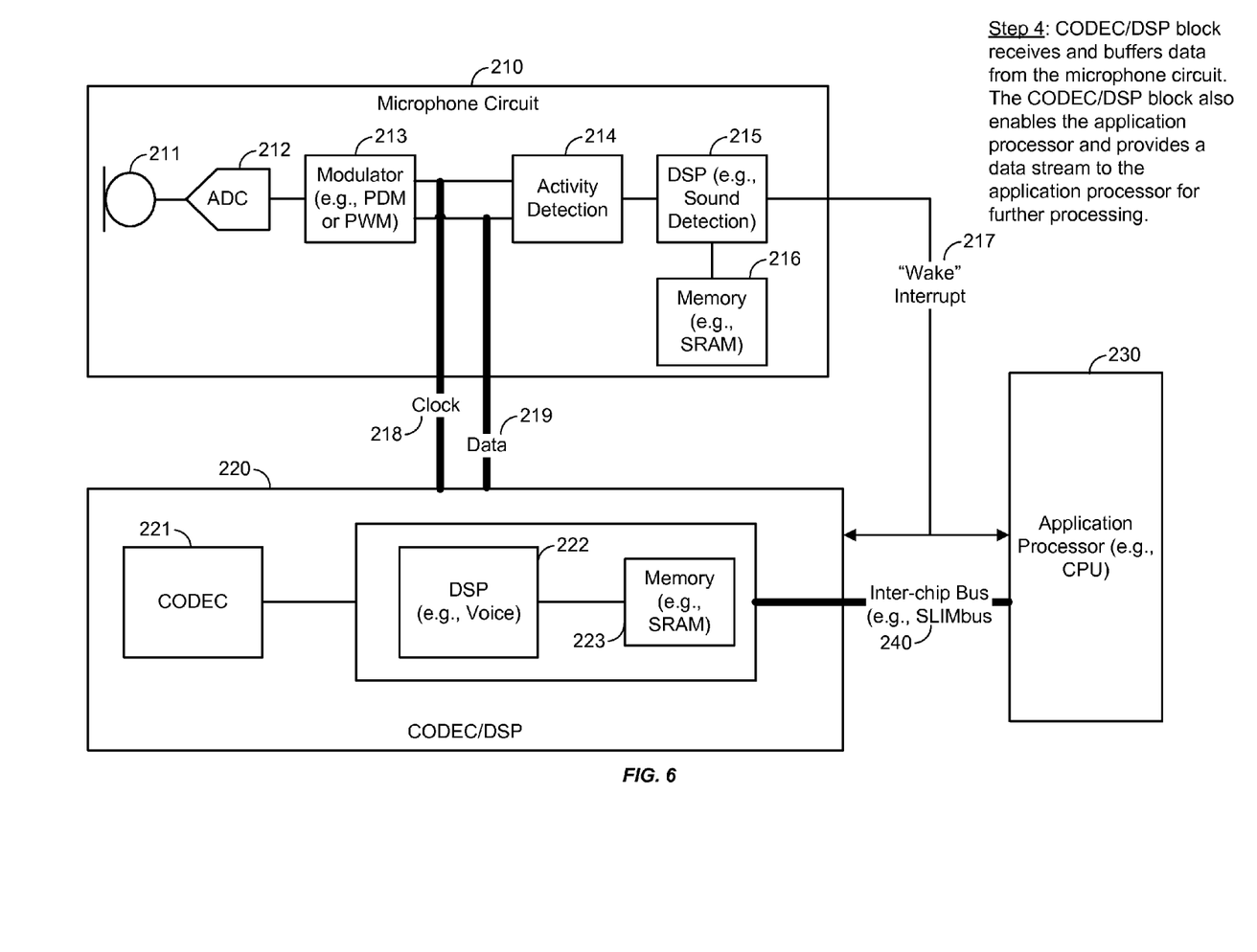
FIG. 6 is a diagram to illustrate a fourth step of operation at the system of FIG. 2.

Continuing to FIG. 6 (designated "Step 4"), the CODEC/DSP block 220 may receive the clock signal 218 and the data 219 from the microphone circuit 210. In a particular embodiment, the CODEC/DSP block 220 may buffer the data 219 in the memory 223. The CODEC/DSP block 220 may also enable the application processor 230 and send the application processor 230 a data stream via the inter-chip bus 240 for further processing.

It should be noted that in certain situations, the system of FIGS. 2-6 may also transition back to an earlier step. For example, if sound detection operations at the first DSP 215 do not detect a sound of interest, the system may transition from the state shown in FIG. 4 back to the initial state shown in FIG. 3.

Figure 7:
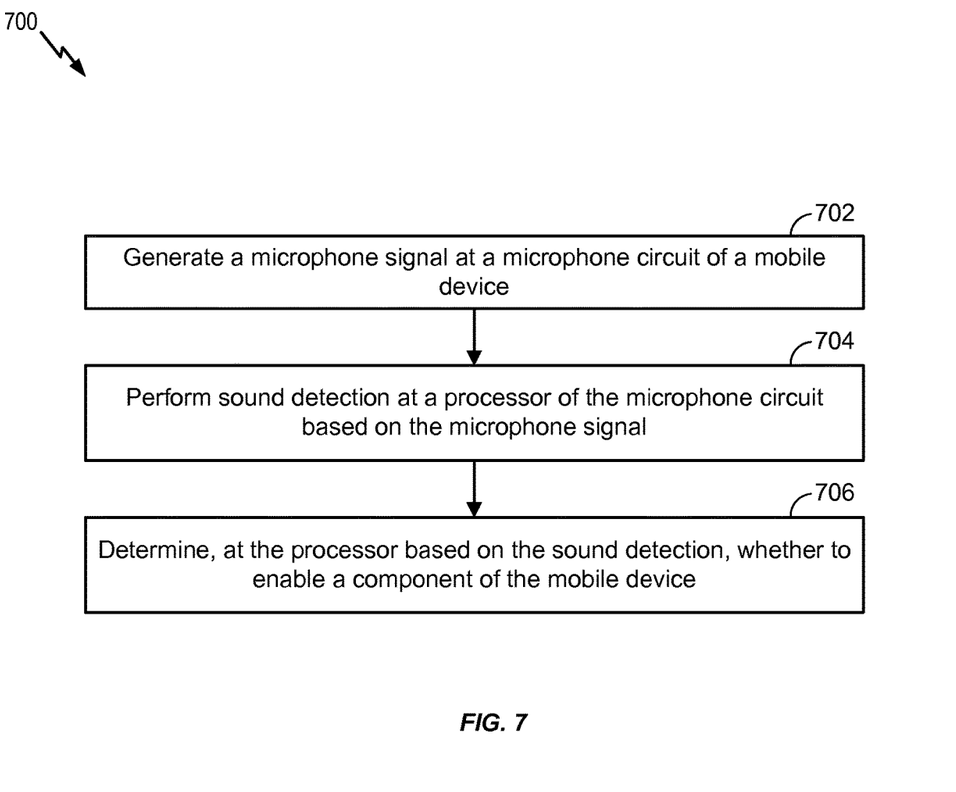
FIG. 7 is a flowchart to illustrate a particular embodiment of operation at the microphone circuit of FIG. 1 or FIG. 2.

Referring to FIG. 7, a particular embodiment of a method 700 of selectively enabling a component by a microphone circuit is shown. In an illustrative embodiment, the method 700 may be performed at the system 100 of FIG. 1 or the system 200 of FIG. 2.

The method 700 may include generating a microphone signal at a microphone circuit of a mobile device, at 702. The method 700 may also include performing sound detection at a processor of the microphone circuit based on the microphone signal, at 704, and determining, at the processor based on the sound detection, whether to enable a component of the mobile device, at 706. For example, in FIG. 1, the microphone 112 of the microphone circuit 110 may generate the microphone signal 114 based on the input signal 102. The detection logic 116 of the microphone circuit 110 may determine whether to enable a component based on a sound detection operation that is performed on the microphone signal 114. To illustrate, the detection logic 116 may determine whether to enable the first component 120 and/or the second component 130. For example, the first component 120 may be a CODEC and/or a DSP. As another example, the second component 130 may be an application processor (e.g., a CPU). The method 700 of FIG. 7 may enable a microphone circuit to selectively activate other components of a mobile device. Performing such determinations at the microphone circuit may enable keeping the other components in sleep mode for longer periods of time, which may reduce overall power consumption of the mobile device.

Figure 8:
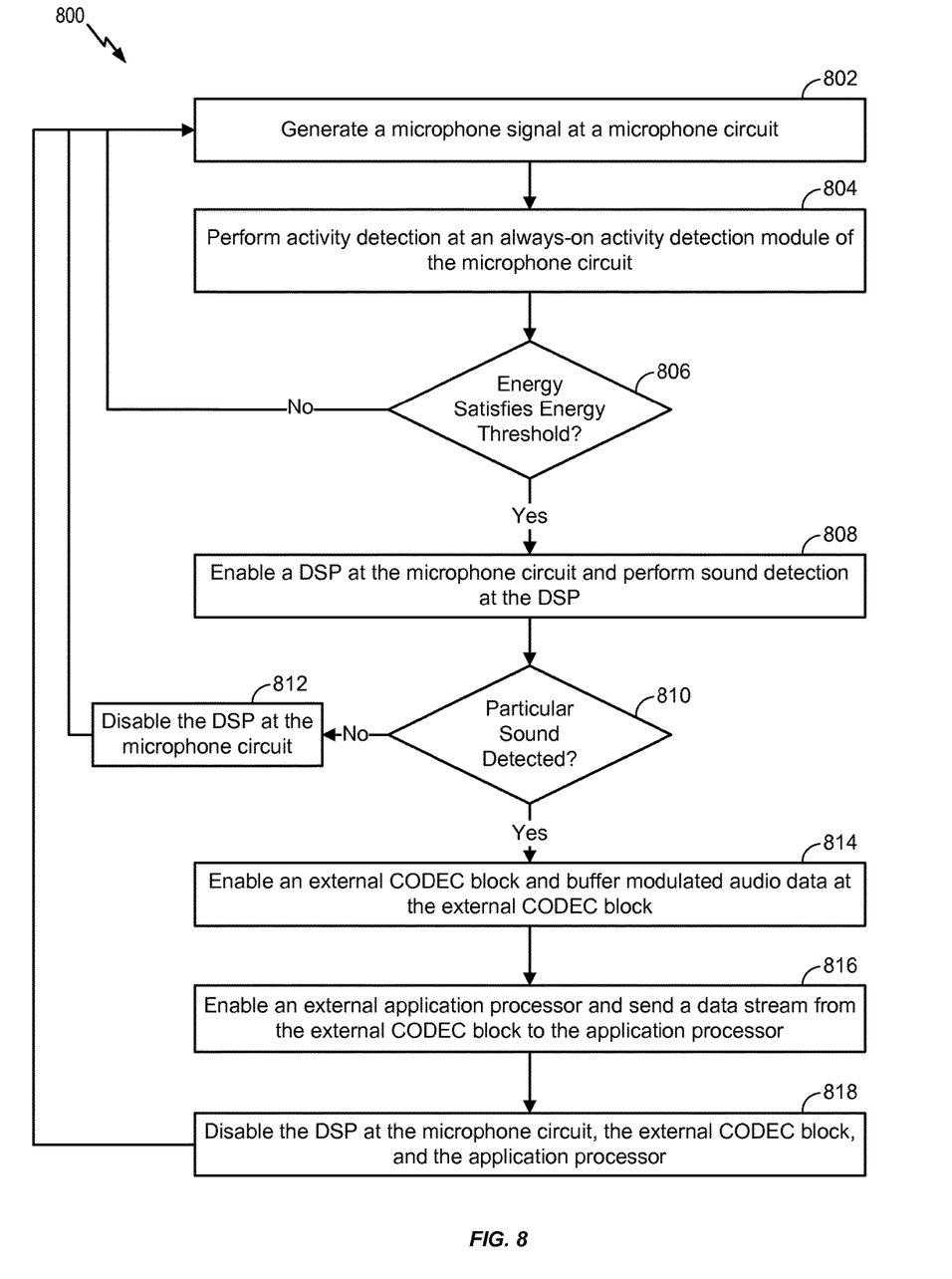
FIG. 8 is a flowchart to illustrate another particular embodiment of operation at the microphone circuit of FIG. 1 or FIG. 2.

Referring to FIG. 8, another particular embodiment of a method 800 of selectively enabling a component by a microphone circuit is shown. In an illustrative embodiment, the method 800 may be performed at the system 100 of FIG. 1 or the system 200 of FIG. 2.

The method 800 may include generating a microphone signal at a microphone circuit, at 802. For example, in FIG. 2, the microphone circuit 210 may generate a microphone signal. The method 800 also may include performing activity detection at an always-on activity detection module of the microphone circuit, at 804. For example, in FIG. 2, the always-on activity detection module 214 may perform MAD operations. In a particular embodiment, the activity detection module 214 may be duty cycled instead of active 100% of the time.

The method 800 further may include determining whether an energy satisfying an energy threshold is detected, at 806. When energy satisfying the energy threshold is not detected, the method 800 may return to 802 and continue audio monitoring operations at the microphone circuit. When energy satisfying the energy threshold is detected, the method 800 includes enabling a DSP at the microphone circuit and performing sound detection at the DSP, at 808. For example, in FIG. 2, the first DSP 215 may be enabled.

The method 800 also may include determining whether a particular sound (e.g., a sound of interest) is detected, at 810. When a particular sound is not detected, the method 800 may include disabling the DSP at the microphone circuit, at 812, and returns to 802. When a particular sound is detected, the method 800 may include enabling an external CODEC block and buffering modulated audio data at the external CODEC block, at 814. For example, in FIG. 2, the CODEC/DSP block 220 may buffer the modulated audio data 219 at the memory 223.

The method 800 may further include enabling an external application processor and sending a data stream from the external CODEC block to the application processor, at 816. For example, in FIG. 2, the CODEC/DSP block 220 may send a data stream to the application processor 230 via the inter-chip bus 240. The method 800 may include disabling the DSP at the microphone circuit, the external CODEC block, and the application processor, at 818, and returning to 802. For example, after further processing (e.g., performing one or more operations based on a received voice command) are performed, a mobile device may return to an initial state in which always-on components are enabled (or have smaller duty cycles) while remaining components are disabled (or have greater duty cycles).

It should be noted that the order of operations illustrated in FIG. 8 is for illustrative purposes only, and is not to be considered limiting. In alternative embodiments, certain operations may be performed in a different order and/or may be performed concurrently with each other (or at least partially concurrently). As an illustrative non-limiting example, in selected embodiments enabling the external CODEC block, at 814, and enabling the application processor, at 816, may be performed concurrently with each other. As another illustrative non-limiting example, in selected embodiments, an application processor may be enabled prior to enabling a CODEC or may be enabled without also enabling the CODEC.

In particular embodiments, the method 700 of FIG. 7, the method 800 of FIG. 8, or at least portion(s) thereof, may be implemented via hardware (e.g., a field-programmable gate array (FPGA) device, an ASIC, etc.) of a processing unit, such as a CPU, a DSP, or a controller, via a firmware device, or any combination thereof. As an example, the method 700 of FIG. 7, the method 800 of FIG. 8, or at least portion(s) thereof, can be performed by a processor that executes instructions, as described with respect to FIG. 9.

Figure 9:
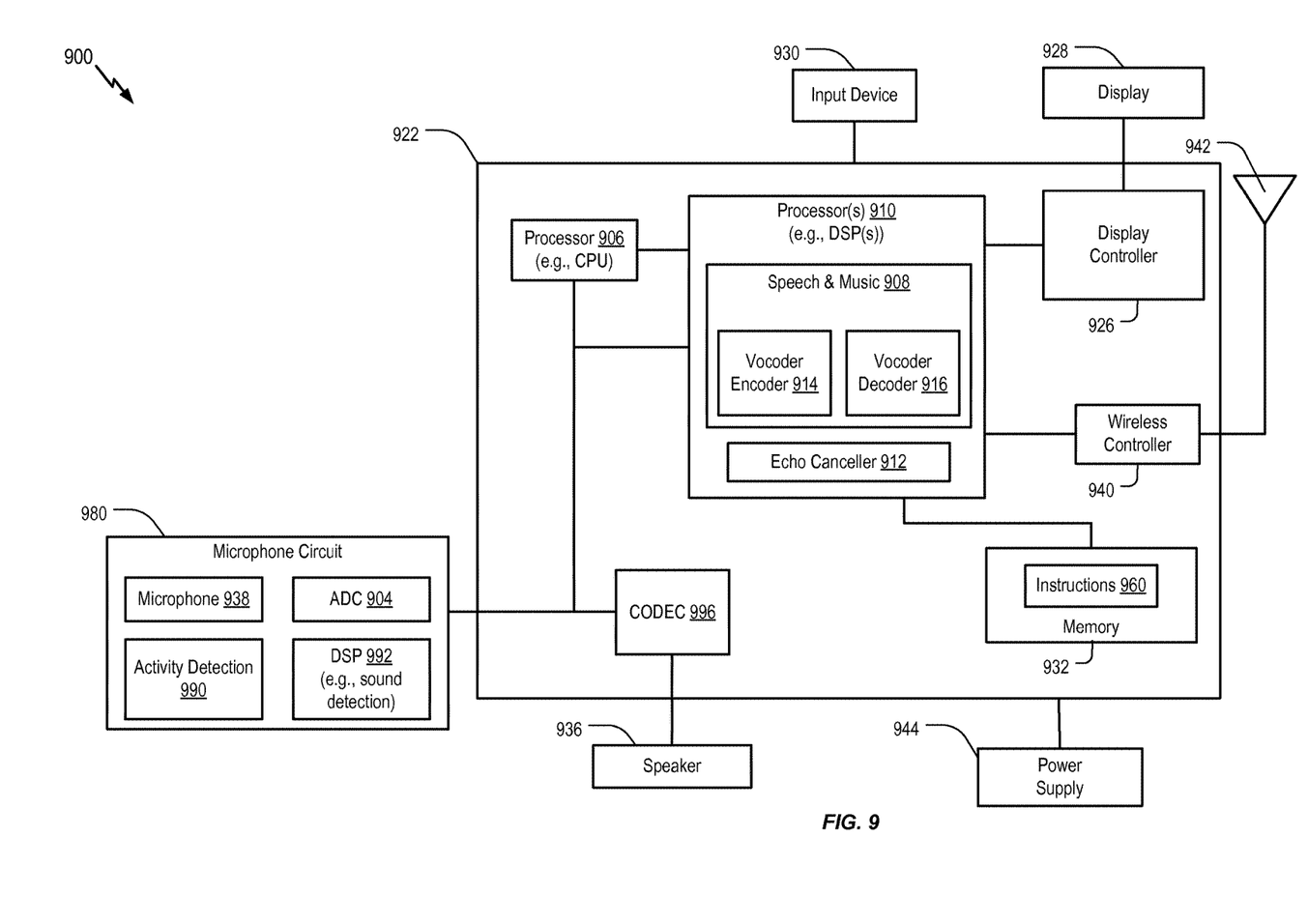
FIG. 9 is a block diagram of a device including the microphone circuit of FIG. 1 or FIG. 2.

Referring to FIG. 9, a block diagram of a particular illustrative embodiment of a device (e.g., a wireless communication device) is depicted and generally designated 900. In various embodiments, the device 900 may have fewer or more components than illustrated in FIG. 9. In an illustrative embodiment, the device 900 may correspond to the system 100 of FIG. 1 or the system 200 of FIG. 2. In an illustrative embodiment, the device 900 may operate according to the method 700 of FIG. 7 and/or the method 800 of FIG. 8.

In a particular embodiment, the device 900 may include a processor 906 (e.g., an application processor). The device 900 may include one or more additional processors 910 (e.g., one or more DSPs). The processors 910 may include a speech and music processing module 908 and an echo canceller 912. The speech and music processing module 908 may include a vocoder encoder 914, a vocoder decoder 916, or both. The processors 910 may be coupled to a CODEC 996. In an illustrative embodiment, the CODEC 996 corresponds to a (e.g., low-power and/or analog) parameter setting and signal processing audio front-end of the device 900. For example, the CODEC 996 may correspond to the CODEC 221 of FIG. 2. In a particular embodiment, the CODEC 996 and/or the speech & music processing module 908 may correspond to an audio activation block or voice activation block of the device 900.

The device 900 may include a memory 932. The memory 932 may include instructions 960 executable by the processor 906, the processors 910, one or more other processing units of the device 900, or a combination thereof, to perform at least a portion of methods and processes disclosed herein, such as the method 700 of FIG. 7 and/or the method 800 of FIG. 8.

The device 900 may include a wireless controller 940 coupled to an antenna 942. The device 900 may include a display 928 coupled to a display controller 926. A microphone circuit 980 and an optional speaker 936 may be included. In an illustrative embodiment, the microphone circuit 980 may correspond to the microphone circuit 110 of FIG. 1 or the microphone circuit 210 of FIG. 2. For example, the microphone circuit may include a microphone 938 (e.g., corresponding to the microphone 112 of FIG. 2 or to the microphone 211 of FIG. 2), an ADC 904 (e.g., corresponding to the ADC 212 of FIG. 2), and an activity detection module 990 (e.g., corresponding to a portion of the detection logic 116 of FIG. 1 or to the activity detection module 214 of FIG. 2). The microphone circuit 980 may also include a DSP 992 (e.g., corresponding to a portion of the detection logic 116 of FIG. 1 or to the first DSP 215 of FIG. 2). In a particular embodiment, the DSP 992 may be configured to perform operations including, but not limited to, sound detection operations. The microphone circuit 980 may selectively enable another component of the device 900, such as the CODEC 996, the application processor 906, and/or the processors 910.

In a particular embodiment, the speech and music processing module 908 or the CODEC 996 may receive digital signals (e.g., modulated audio data) from the microphone circuit 980 and may process the digital signals. In a particular embodiment, the speech and music processing module 908 or the CODEC 996 may also provide digital signals to a digital-to-analog converter (not shown), which may convert the digital signals to analog signals and provide the analog signals to the speaker 936.

One or more components of the system 100 of FIG. 1, the system 200 of FIG. 2, and/or the device 900 may be implemented via dedicated hardware (e.g., circuitry), a processor executing instructions to perform one or more tasks, or a combination thereof. As an example, the memory 932, one or more components of the speech and music processing module 908, and/or one or more components of the CODEC 996 may be a memory device, such as a random access memory (RAM), SRAM, magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, or an optical disc (e.g., compact disc read-only memory (CD-ROM), blu-ray disc, digital video disc (DVD), etc.). The memory device may include instructions (e.g., the instructions 960) that, when executed by a computer (e.g., one or more components of the microphone circuit 980, the processor 906, and/or the processors 910), may cause the computer to perform at least a portion of the method 700 of FIG. 7 and/or the method 800 of FIG. 8. As an example, the memory device may be a non-transitory computer-readable medium that stores instructions (e.g., the instructions 960) that, when executed by a computer (e.g., one or more components of the microphone circuit 980, the CODEC 996, the processor 906, and/or the processors 910), cause the computer perform at least a portion of the method 700 of FIG. 7 and/or the method 800 of FIG. 8.

In a particular embodiment, the device 900 may be included in one or more system-in-package (SiP) or SoC devices (e.g., a mobile station modem (MSM)). For example, the microphone circuit 980 may be located on a first chip and the processor 906, the processor 910, the CODEC 996, the display controller 926, the memory 932, and the wireless controller 940 may be located on a separate SiP or SoC device 922.

In a particular embodiment, an input device 930, such as a touchscreen and/or keypad, and a power supply 944 may be coupled to the SiP or SoC device 922. Moreover, in a particular embodiment, as illustrated in FIG. 9, the display 928, the input device 930, the speaker 936, the antenna 942, and the power supply 944 are external to the SiP or SoC device 922. However, each of the display 928, the input device 930, the speaker 936, the antenna 942, and the power supply 944 can be coupled to a component of the SiP or SoC device 922, such as an interface or a controller.

In a particular embodiment, the device 900 may include, or is included within, a mobile communication device, a smart phone, a cellular phone, a laptop computer, a computer, a tablet, a personal digital assistant, a display device, a television, a gaming console, a music player, a radio, a digital video player, an optical disc player, a tuner, a camera, a navigation device, a decoder system, or any combination thereof.

Unless expressly limited by its context, the term "producing" is used to indicate any of its ordinary meanings, such as calculating, generating, and/or providing. Unless expressly limited by its context, the term "providing" is used to indicate any of its ordinary meanings, such as calculating, generating, and/or producing. Unless expressly limited by its context, the term "coupled" is used to indicate a direct or indirect electrical or physical connection. If the connection is indirect, it is well understood by a person having ordinary skill in the art, that there may be other blocks or components between the structures being "coupled."

The term "configuration" may be used in reference to a method, apparatus/device, and/or system as indicated by its particular context. Where the term "comprising" is used in the present description and claims, it does not exclude other elements or operations. The term "based on" (as in "A is based on B") is used to indicate any of its ordinary meanings, including the cases (i) "based on at least" (e.g., "A is based on at least B") and, if appropriate in the particular context, (ii) "equal to" (e.g., "A is equal to B"). In the case (i) where A is based on B includes based on at least, this may include the configuration where A is coupled to B. Similarly, the term "in response to" is used to indicate any of its ordinary meanings, including "in response to at least." The term "at least one" is used to indicate any of its ordinary meanings, including "one or more". The term "at least two" is used to indicate any of its ordinary meanings, including "two or more."

The terms "apparatus" and "device" are used generically and interchangeably unless otherwise indicated by the particular context. Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The terms "method," "process," "procedure," and "technique" are used generically and interchangeably unless otherwise indicated by the particular context. The terms "element" and "module" may be used to indicate a portion of a greater configuration. Any incorporation by reference of a portion of a document shall also be understood to incorporate definitions of terms or variables that are referenced within the portion, where such definitions appear elsewhere in the document, as well as any figures referenced in the incorporated portion.

Various functions may be described herein as being performed by certain components or modules. However, this division of components and modules is for illustration only. In an alternate embodiment, a function performed by a particular component or module may be divided amongst multiple components or modules. Moreover, in an alternate embodiment, two or more components or modules may be integrated into a single component or module. Each component or module may be implemented using hardware (e.g., a FPGA device, an ASIC, a DSP, a controller, etc.), software (e.g., instructions executable by a processor, such as a CPU), or any combination thereof.

In conjunction with the described embodiments, an apparatus is disclosed that includes means for generating a microphone signal. For example, the means for generating may include the microphone 112, the microphone 211, the ADC 212, the modulator 213, the microphone 938, the ADC 904, another device configured to generate a microphone signal, or any combination thereof. The apparatus also includes means for performing sound detection based on the microphone signal and for determining whether to enable a component external to the microphone circuit based on the sound detection. For example, the means for performing and for determining may include the detection logic 116, the first DSP 215, the DSP 992, another device configured to perform sound detection and to determine whether to enable an external component based on the sound detection, or any combination thereof. The apparatus may further include means for storing data used by the means for performing sound detection. For example, the means for storing data may include the memory 216 of FIG. 2, a SRAM device of a microphone circuit, another device configured to store data, or any combination thereof.

Those of skill would further appreciate that the various illustrative logical blocks, configurations, modules, circuits, and algorithm steps described in connection with the embodiments disclosed herein may be implemented as electronic hardware, computer software executed by a processing device such as a hardware processor, or combinations of both. Various illustrative components, blocks, configurations, modules, circuits, and steps have been described above generally in terms of their functionality. Whether such functionality is implemented as hardware or executable software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in a memory device, such as RAM, MRAM, STT-MRAM, flash memory, ROM, PROM, EPROM, EEPROM, registers, hard disk, a removable disk, or an optical disc. An exemplary memory device is coupled to the processor such that the processor can read information from, and write information to, the memory device. In the alternative, the memory device may be integral to the processor. The processor and the storage medium may reside in an ASIC. The ASIC may reside in a computing device or a user terminal. In the alternative, the processor and the storage medium may reside as discrete components in a computing device or a user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:
1. An apparatus comprising:
a microphone of a microphone circuit, the microphone configured to generate a microphone signal; and
a processor of the microphone circuit, the processor configured to perform sound detection based on the microphone signal, to generate an enable signal based on a result of the sound detection, and to transmit the enable signal to enable a coder/decoder (CODEC).

2. The apparatus of claim 1, wherein the (CODEC) is off-chip with respect to the microphone circuit.

3. The apparatus of claim 1, wherein the processor is further configured to determine whether to generate an application processor enable signal based on the sound detection.

4. The apparatus of claim 1, wherein the processor is a digital signal processor.

5. The apparatus of claim 1, wherein the microphone comprises an always-on microphone.

6. The apparatus of claim 1, wherein the microphone circuit further comprises an activity detection module configured to selectively enable the processor based on the microphone signal.

7. The apparatus of claim 6, further comprising a memory coupled to the processor, wherein the memory stores data used during the sound detection.

8. The apparatus of claim 1, wherein the processor is further configured to generate the enable signal in response to detecting a particular sound, wherein operation of the CODEC consumes more power than operation of the microphone circuit.

9. The apparatus of claim 1, wherein the microphone, the processor, or both has a duty cycle that is greater than a duty cycle of the CODEC.

10. The apparatus of claim 1, further comprising an analog-to-digital converter and a modulator, wherein the modulator comprises a pulse-density modulator or a pulse-width modulator.

11. The apparatus of claim 1, wherein the microphone circuit is configured to output a clock signal after the enable signal is generated by the processor.

12. The apparatus of claim 1, wherein the microphone circuit is configured to be coupled to the CODEC and to an application processor, wherein the processor is further configured to determine whether to generate an application enable signal based on the sound detection, and wherein the microphone circuit is further configured to transmit the application enable signal to the application processor.

13. The apparatus of claim 1, wherein the microphone circuit further comprises:
an analog-to-digital converter (ADC) coupled to the microphone and configured to generate a digital microphone signal based on the microphone signal;
a modulator coupled to the ADC and configured to generate a modulated microphone signal based on the digital microphone signal;
an activity module coupled to the modulator and configured to selectively enable the processor based on the modulated microphone signal; and
a memory coupled to the processor, the memory configured to store data corresponding to the sound detection.

14. A method comprising:
generating a microphone signal at a microphone circuit of a mobile device;
performing, at a processor of the microphone circuit, sound detection based on the microphone signal;
generating an enable signal at the processor based on a result of the sound detection; and transmitting the enable signal to enable a coder/decoder (CODEC).

15. The method of claim 14, further comprising determining, at the processor based on the sound detection, whether to generate an application processor enable signal.

16. The method of claim 14, wherein the processor is selectively enabled or disabled based on the microphone signal, and wherein the sound detection determines whether the microphone signal represents a particular sound.

17. The method of claim 14, wherein the enable signal causes the CODEC to enter an active mode of operation.

18. The method of claim 14, further comprising:
prior to performing the sound detection, performing microphone activity detection at a microphone activity module of the microphone circuit based on the microphone signal; and
selectively enabling the processor based on a result of the microphone activity detection.

19. The method of claim 14, further comprising transmitting modulated audio data from the microphone circuit to the CODEC after outputting the enable signal.

20. An apparatus comprising:
a microphone circuit comprising:
means for generating a microphone signal; and
means for performing sound detection based on the microphone signal and for generating an enable signal based on a result of the sound detection, the enable signal to be transmitted to enable a coder/decoder (CODEC).

21. The apparatus of claim 20, wherein the means for performing sound detection is configured to determine whether the microphone signal represents a particular sound.

22. The apparatus of claim 20, further comprising means for storing data used by the means for performing sound detection.

23. The apparatus of claim 20, further comprising the CODEC, wherein the CODEC is external to the microphone circuit and configured to be selectively enabled by the enable signal, wherein operation of the CODEC consumes more power than operation of the microphone circuit.

24. The apparatus of claim 23, wherein the CODEC is configured to buffer modulated audio data received from the microphone circuit.

25. The apparatus of claim 20, further comprising a digital signal processor external to the microphone circuit and configured to buffer audio data.

26. The apparatus of claim 25, wherein the digital signal processor is configured to send a data stream based on the buffered audio data to an application processor.

27. The apparatus of claim 26, further comprising the application processor.

28. A non-transitory computer-readable storage medium comprising instructions that, when executed by a computer, cause the computer to perform operations comprising:
performing sound detection at a processor of a microphone circuit of a mobile device based on a microphone signal;
generating an enable signal based on a result of the sound detection; and transmitting the enable signal to enable a coder/decoder (CODEC).

29. The non-transitory computer-readable storage medium of claim 28, wherein the enable signal causes the CODEC to enter an active mode of operation, and wherein the CODEC is off-chip with respect to the microphone circuit.

30. The non-transitory computer-readable storage medium of claim 28, wherein the processor of the microphone circuit is selectively enabled or disabled based on the microphone signal.

* * * * *